Jan. 6, 1970

R. L. KONOPA 3,488,560

TRANSIENT POTENTIAL PROTECTION CIRCUIT

Filed May 1, 1967

INVENTOR.
Richard L. Konopa
BY
Richard G. Stahr
ATTORNEY

United States Patent Office 3,488,560
Patented Jan. 6, 1970

3,488,560
TRANSIENT POTENTIAL PROTECTION CIRCUIT
Richard L. Konopa, Anderson, Ind., assignor to General Motors Corporation, Detroit, Mich., a corporation of Delaware
Filed May 1, 1967, Ser. No. 634,993
Int. Cl. H02h 3/28, 3/22
U.S. Cl. 317—31             4 Claims

ABSTRACT OF THE DISCLOSURE

To suppress or minimize the effects of transient potentials which may be produced upon the opening of the direct current circuit of an electrical generating system having a rotary type dynamoelectric machine for generating the alternating current potential, the current carrying electrodes of a semiconductor switching device, such as a silicon control rectifier, are connected between each output winding of the dynamoelectric machine and a point of reference or ground potential, in parallel. The control electrodes of the switching devices are connected in parallel to the anode electrode of a Zener diode. The Zener diode is selected to have an inverse breakdown potential of a magnitude slightly greater than the maximum system potential and, therefore, breaks down with transient potentials exceeding this magnitude to supply a control signal to the control electrodes of the semiconductor switching devices. With the semiconductor switching devices in the conducting mode, the transient potentials are diverted to the point of reference or ground potential.

---

This invention relates to transient protection circuits and, more specifically, to a transient protection circuit suitable for use in combination with a dynamoelectric machine and rectifier circuit.

Because of the high inductance in the field of dynamoelectric machines, intolerably high transient potentials may be produced in the dynamoelectric machine output windings in the event the direct current load is suddenly disconnected. These high potentials may seriously damage or destroy associated delicate circuit components such as the rectifier circuit diodes and the semiconductor components which comprise a semiconductor potential regulator.

It is, therefore, an object of this invention to provide an improved transient potential protection circuit.

It is another object of this invention to provide an improved transient potential protection circuit suitable for use in combination with a dynamoelectric machine and rectifier circuit.

In accordance with this invention, a transient potential protection circuit suitable for use in combination with a dynamoelectric machine and rectifier circuit is provided wherein the dynamoelectric machine output windings are substantially short circuited to a point of reference or ground potential with high transient potential conditions through the current carrying electrodes of respective controllable semiconductor switching devices which are triggered conductive, upon the occurrence of the transient potentials, by a control signal produced by a potential sensitive circuit arrangement connected across the direct current circuitry.

Figure 1:
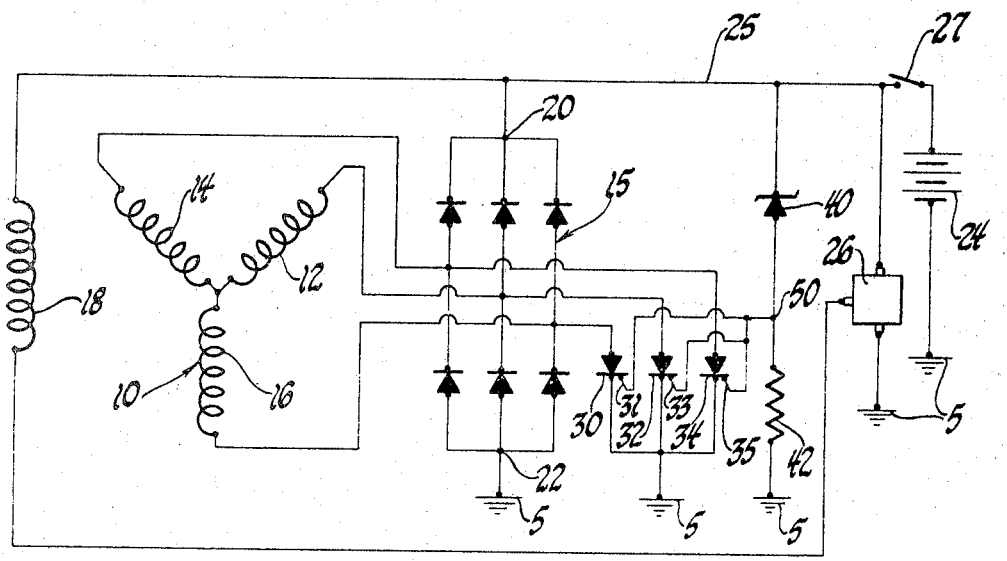
Figure 2:
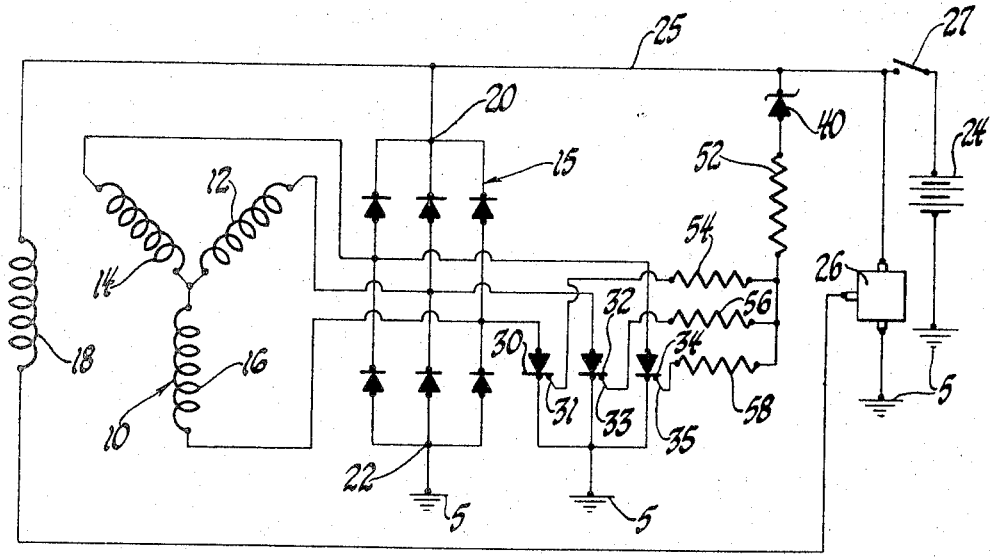

For a better understanding of the present invention, together with additional objects, advantages and features thereof, reference is made to the following description and accompanying drawings in which:

FIGURE 1 sets forth one embodiment of the transient potential protection circuit of this invention in schematic form, and FIGURE 2 sets forth another embodiment of the transient potential protection circuit of this invention in schematic form.

Throughout the two figures of the drawing, like elements have been identified by like characters of reference.

Referring to the figures, two embodiments of the transient potential protection circuit of this invention are set forth in schematic form in combination with a dynamoelectric machine 10 having output windings 12, 14 and 16 and a field winding 18 and a rectifier circuit 15 having three conventional diodes in the positive polarity bank and three conventional diodes in the negative polarity bank. Respective output windings of dynamoelectric machine 10 are connected to the alternating current input circuit terminals of rectifier 15 in a conventional manner. The alternating current potential generated in dynamoelectric machine 10 is full wave rectified and appears as a direct current system potential across positive polarity direct current output circuit terminal 20 and negative polarity direct current output circuit terminal 22 of rectifier circuit 15. Negative polarity direct current output circuit terminal 22 of rectifier circuit 15 may be connected to a point of reference or ground potential 5 which, since it is the same point electrically throughout the system, has been schematically represented by the accepted symbol and referenced by the numeral 5. The system potential may be employed to charge a conventional storage type battery 24 connected across the positive polarity direct current potential line 25 and point of reference or ground potential 5 and poled as shown. A conventional single pole single throw switch 27 may be included in the circuit to selectively connect and disconnect battery 24. The output of dynamoelectric machine 10 may be regulated by a conventional solid state type potential regulator 26 which, since it may be any one of several potential regulators of this type well known in the art and forms no part of this invention, has been illustrated in block form.

Corresponding to each dynamoelectric machine output winding is a semiconductor switching device having two current carrying electrodes and a control electrode. In the figures, these semiconductor switching devices have been shown as silicon controlled rectifiers 30, 32 and 34 each having a respective control electrode 31, 33 and 35.

The silicon controlled rectifier is a semiconductor device having a control electrode, generally termed the gate electrode, and two current carrying electrodes, generally termed the anode and cathode electrodes, which is designed to normally block current flow in either direction. With the anode-cathode electrodes forward poled, anode positive and cathode negative, the silicon controlled rectifier may be triggered to conduction upon the application, to the control electrode, of a control potential signal of a polarity which is positive in respect to the potential present upon the cathode electrode and of sufficient magnitude to produce control electrode-cathode, or gate, current. In the conducting state, the silicon controlled rectifier will conduct current in one direction and retains the ability to block current flow in the opposite direction. Upon being triggered to conduction, however, the control electrode is no longer capable of affecting the device which will remain in the conducting state until either the anode-cathode circuit is interrupted or the polarity of the potential applied across the anode-cathode electrodes is reversed.

The current carrying electrodes of each silicon control rectifiers 30, 32 and 34 are connected in series between the corresponding dynamoelectric machine output winding and point of reference or ground potential 5 through the alternating current input terminals of rectifier circuit 15 as shown. Therefore, each of these devices becomes forward poled as the potential induced in the corresponding dynamoelectric machine winding is of a positive polarity at the terminal end and each becomes reverse poled as the potential induced in the corresponding dynamoelectric machine output winding is of a negative polarity at the terminal end.

To produce a control signal upon the occurrence of a transient potential in the dynamoelectric machine output windings, a Zener diode 40 may be connected between the positive polarity direct current potential line 25 and the control electrodes of the semiconductor switching devices in parallel, as shown in the figures.

The Zener diode is a semiconductor device having two current carrying electrodes, generally referred to as the anode and cathode electrodes, which is designed to function as a conventional diode and conduct current in a forward direction when forward poled, anode positive and cathode negative, and to conduct current in a reverse direction when reverse poled, anode negative and cathode positive, when the applied potential exceeds the rated inverse breakdown potential of the device.

As the cathode electrode of Zener diode 40 is connected to the positive polarity direct current potential line 25, and the anode electrode thereof is connected to the control electrodes of the silicon controlled rectifiers in parallel, this device is reverse poled.

In FIGURE 1, a resistor 42 is connected between junction 50 and point of reference or ground potential 5, while in FIGURE 2, the series combination of respective parallel resistors 54, 56 and 58 and resistor 52 is connected between the anode electrode of Zener diode 40 and the control electrodes of the silicon control rectifiers.

With either circuit, upon the occurrence of a transient potential of a magnitude greater than the rated inverse breakdown potential of Zener diode 40, this device breaks down and conducts current in a reverse direction, a condition which produces the required gate current to trigger silicon control rectifiers 30, 32 and 34 conductive. With these devices conducting, the dynamoelectric machine potential, and the transient potential is short circuited to point of reference or ground potential 5. The return circuit, of course, is through the negative polarity bank of diodes of the rectifier circuit and another output winding. Therefore, the high transient potential neither harms nor destroys the rectifier circuit diodes or any semiconductor device which may be included in potential regulator 26.

In the circuit of FIGURE 2, resistor 52 and the parallel combination of resistors 54, 56 and 58 reduce the magnitude of gate current through the silicon control rectifier device.

As a potential induced in dynamoelectric machine output windings 12, 14 and 16 is an alternating current potential, each silicon control rectifier is extinguished as the potential induced in the corresponding output winding is of a negative polarity at the terminal end.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A transient potential protection circuit for use with dynamoelectric machines comprising in combination with a dynamoelectric machine having output windings and a rectifier circuit having positive and negative polarity output circuit means, a semiconductor switching device having two current carrying electrodes and a control electrode corresponding to each said output winding of said dynamoelectric machine, means for connecting said current carrying electrodes of each of said semiconductor switching devices in series between the corresponding said output winding and a point of reference or ground potential, a Zener diode having anode and cathode electrodes, means for connecting said cathode electrode to said positive polarity output circuit means and means for connecting said anode electrode to the said control electrode of each of said semiconductor switching devices in parallel.

2. A transient potential protection circuit for use with dynamoelectric machines comprising in combination with a dynamoelectric machine having output windings and a rectifier circuit having positive and negative polarity output circuit means, a silicon control rectifier device having two current carrying electrodes and a control electrode corresponding to each said output winding of said dynamoelectric machine, means for connecting said current carrying electrodes of each of said silicon control rectifier devices in series between the corresponding said output winding and a point of reference or ground potential, a Zener diode having anode and cathode electrodes, means for connecting said cathode electrode to said positive polarity output circuit means and means for connecting said anode electrode to the said control electrode of each of said silicon control rectifier devices in parallel.

3. A transient potential protection circuit for use with dynamoelectric machines comprising in combination with a dynamoelectric machine having output windings and a rectifier circuit having positive and negative polarity output circuit means, a silicon control rectifier device having two current carrying electrodes and a control electrode corresponding to each said output winding of said dynamo-electric machine, means for connecting said current carrying electrodes of each of said silicon control rectifier devices in series between the corresponding said output winding and a point of reference or ground potential, a Zener diode having anode and cathode electrodes, a resistor, means for connecting said cathode electrode to said positive polarity output circuit means, means for connecting said anode electrode to a point of reference or ground potential through said resistor and means for connecting said control electrode of each of said silicon control rectifier devices to the junction between said anode electrode and said resistor.

4. A transient potential protection circuit for use with dynamoelectric machines comprising in combination with a dynamoelectric machine having output windings and a rectifier circuit having positive and negative polarity output circuit means, a silicon control rectifier device having two current carrying electrodes and a control electrode corresponding to each said output winding of said dynamoelectric machine, means for connecting said current carrying electrodes of each of said silicon control rectifier devices in series between the corresponding said output winding and a point of reference or ground potential, a Zener diode having anode and cathode electrodes, a resistor corresponding to each said silicon controlled rectifier device, means for connecting said cathode electrode to said positive polarity output circuit means and means for connecting said anode electrode to the said control electrode of each of said silicon control rectifier devices through the corresponding said resistor in parallel.

References Cited

UNITED STATES PATENTS

| 3,173,077 | 3/1965 | Kirk et al. | 322—28 |
| 3,213,323 | 10/1965 | Circle | 317—50 |
| 3,213,349 | 10/1965 | Gutzwiller | 317—33 |
| 3,314,001 | 4/1967 | Brockman | 322—73 |
| 3,315,141 | 4/1967 | Wright et al. | 322—28 |

LEE T. HIX, Primary Examiner

S. WEINBERG, Assistant Examiner

U.S. Cl. X.R.

317—50; 321—5, 321—11; 322—28